United States Patent [19]

Bills

[11] Patent Number: 4,728,114
[45] Date of Patent: Mar. 1, 1988

[54] DEVICE FOR RAISING, LOWERING AND POSITIONING A PINTLE EYE STYLE DETACHABLE GOOSENECK TRAILER HITCH ASSEMBLY

[75] Inventor: Joseph W. Bills, Mitchell, S. Dak.

[73] Assignee: Dakota Manufacturing Co., Mitchell, S. Dak.

[21] Appl. No.: 4,552

[22] Filed: Jan. 16, 1987

[51] Int. Cl.⁴ .............................................. B62D 53/06
[52] U.S. Cl. ............................ 280/425 A; 280/423 B; 414/481
[58] Field of Search ........... 280/423 B, 425 A, 479 R, 280/490 R, 515; 414/481

[56] References Cited

U.S. PATENT DOCUMENTS

| | | | |
|---|---|---|---|
| 2,613,945 | 10/1952 | Talbert | 280/423 B |
| 2,784,857 | 3/1957 | Duffy | 280/425 A X |
| 2,851,181 | 9/1958 | Thomann | 414/481 |
| 2,872,059 | 2/1959 | Miller | 280/423 B X |
| 2,894,764 | 7/1959 | Ronk | 280/423 B X |
| 3,066,954 | 12/1962 | Brockmann | 280/423 B |

FOREIGN PATENT DOCUMENTS 1237449  3/1967  Fed. Rep. of Germany ... 280/425 A

Primary Examiner—John A. Pekar
Assistant Examiner—Charles R. Watts
Attorney, Agent, or Firm—Zarley, McKee, Thomte, Voorhees & Sease

[57] ABSTRACT

A device is disclosed for raising, lowering and positioning a pintle eye style detachable gooseneck hitch assembly of a trailer. The gooseneck hitch assembly is connected at its forward end to a pintle hook positioned at the rearward end of the truck. A hydraulic cylinder is pivotally connected at its rearward end to the gooseneck hitch assembly and has a pair of chains secured to its forward rod end with the chains extending forwardly and outwardly therefrom for connection to the rearward end of the truck laterally and above the pintle eye-pintle hook connection. Extension of the rod of the hydraulic cylinder causes the rearward end of the hitch assembly to be lowered relative to the ground. Conversely, retraction of the rod of the hydraulic cylinder causes the rearward end of the hitch assembly to be raised. The hydraulic cylinder permits the hitch assembly to be maneuvered or positioned relative to the trailer when the hitch assembly is being detached from the trailer or being connected thereto.

2 Claims, 7 Drawing Figures

DEVICE FOR RAISING, LOWERING AND POSITIONING A PINTLE EYE STYLE DETACHABLE GOOSENECK TRAILER HITCH ASSEMBLY

BACKGROUND OF THE INVENTION

Detachable gooseneck trailers normally comprise a main trailer portion having a detachable gooseneck hitch apparatus at the forward end thereof. Detachable gooseneck trailers may either be of the kingpin-fifth wheel type or the pintle eye-pintle hook type.

In the pintle eye-pintle hook type of detachable gooseneck trailers, a pintle eye is provided on the forward end of the detachable gooseneck structure for connection with a pintle hook provided on the rear of the truck. When the gooseneck structure is disconnected from the trailer, the gooseneck structure is free to pivot about the pintle eye-pintle hook connection. A special device is therefore required to raise, lower and position the gooseneck during the connect and disconnect sequence.

It is therefore a principal object of the invention to provide a device for raising, lowering and positioning a pintle eye style detachable gooseneck trailer.

A further object of the invention is to provide an apparatus of the type described which permits control of the pintle eye detachable gooseneck by means of end fittings permanently affixed to the truck.

Yet another object of the invention is to provide a device of the type described which may be easily attached and disconnected from a gooseneck trailer.

Yet another object of the invention is to provide a device of the type described which permits control of the pintle eye detachable gooseneck by means of a hydraulic cylinder and an attachment arm assembly on the neck.

Yet another object of the invention is to provide a device of the type described which is economical of manufacture, durable in use and refined in appearance.

These and other objects will be apparent to those skilled in the art.

SUMMARY OF THE INVENTION

Figure 1:
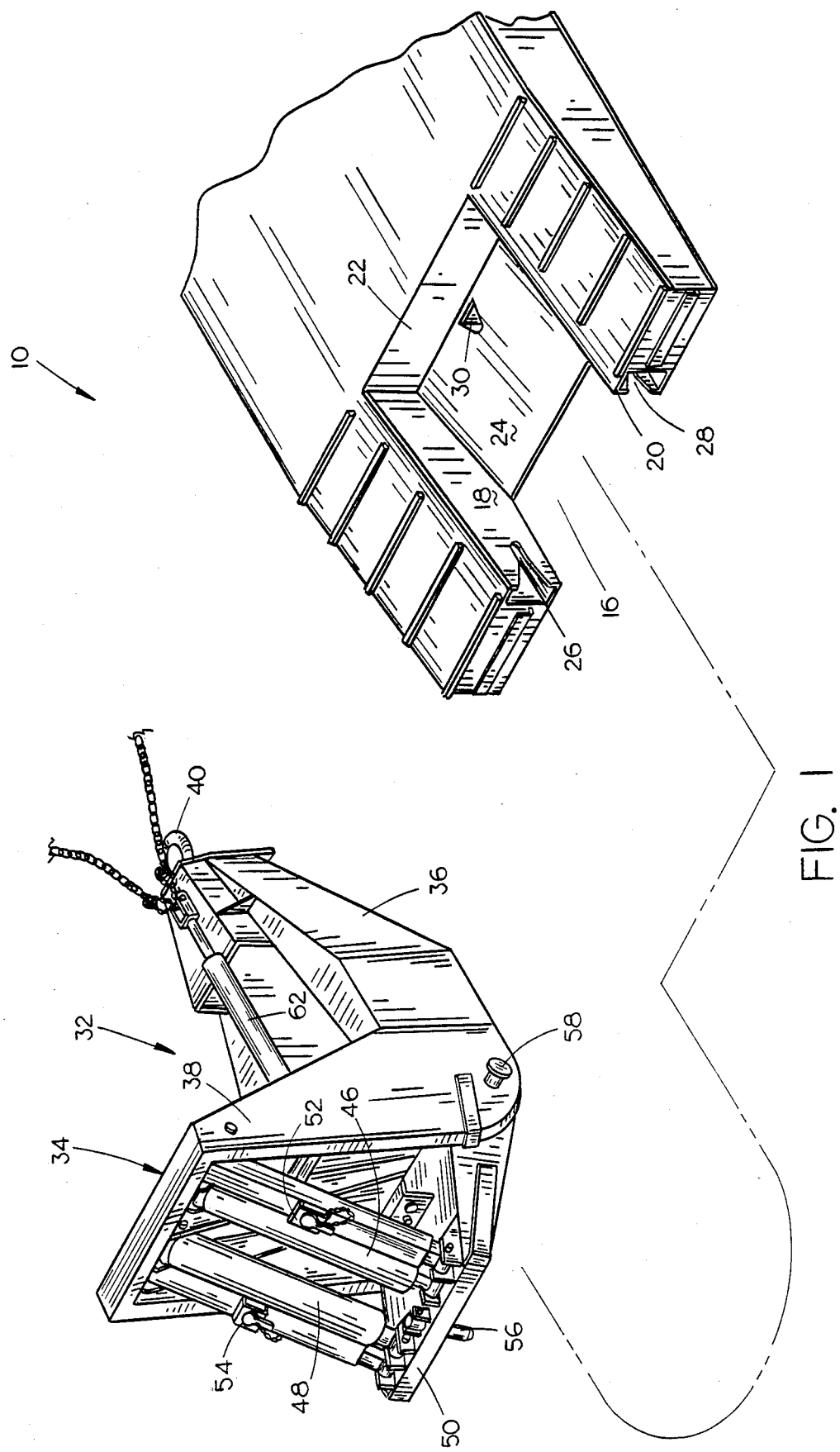
FIG. 1 is an exploded perspective view of the forward end of the trailer of this invention.
Figure 2:
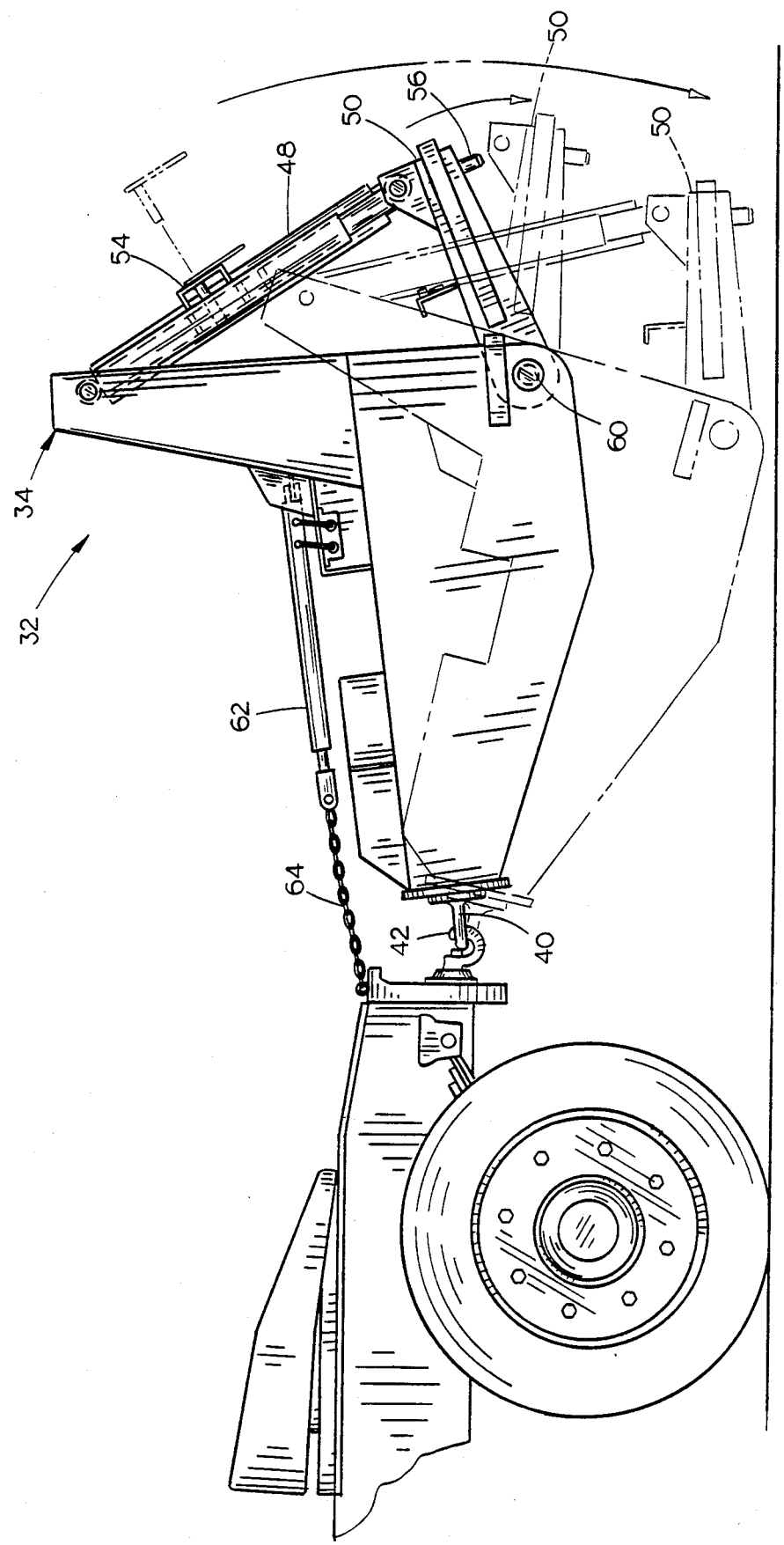
FIG. 2 is a side elevational view of the forward portion of the trailer illustrating the detachable gooseneck structure secured to the rearward end of a truck and with the broken lines illustrating alternate positions to which the structure may be moved.
Figure 3:
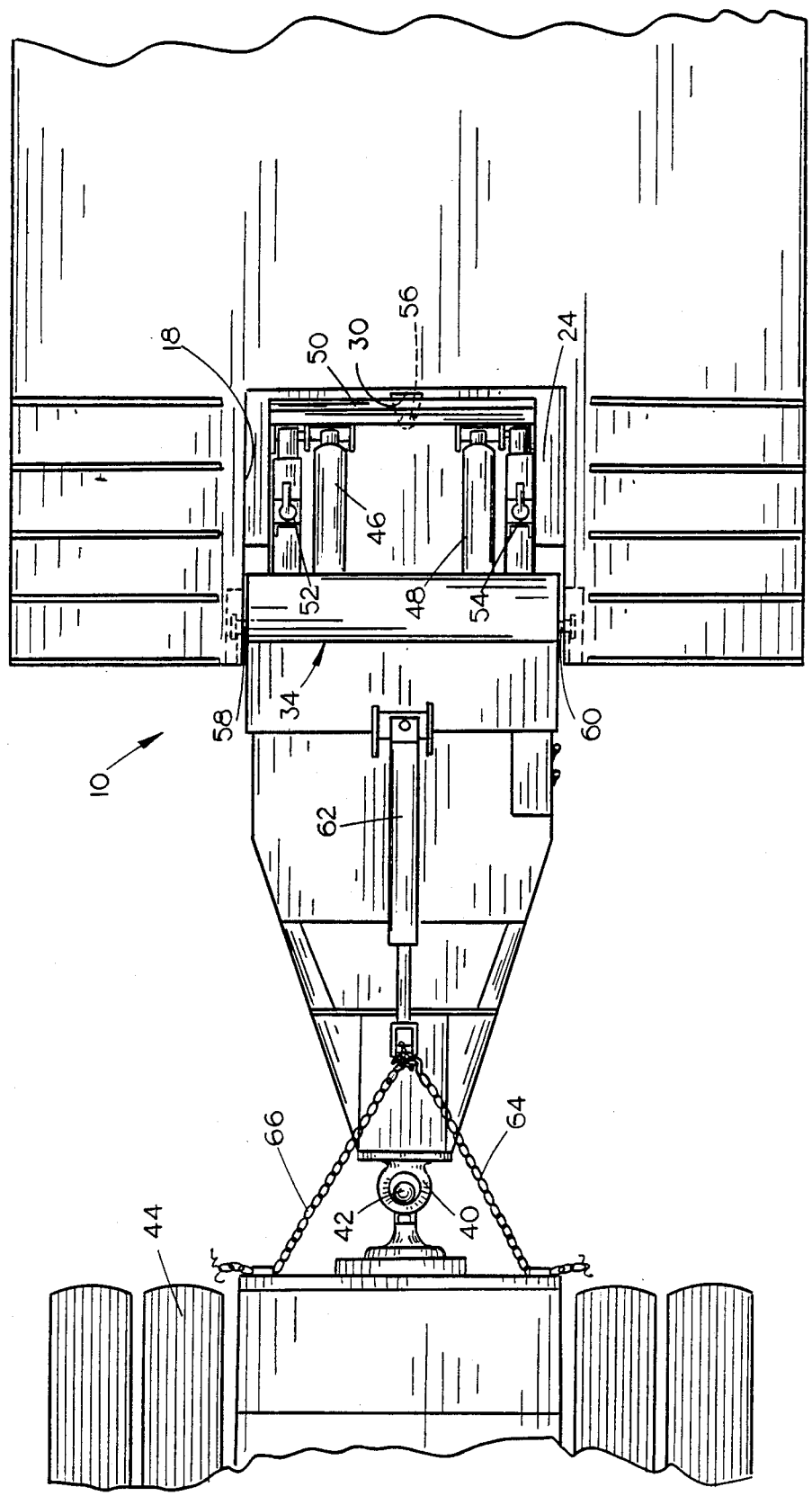
FIG. 3 is a top view of the structure seen in FIG. 2.
Figure 4:
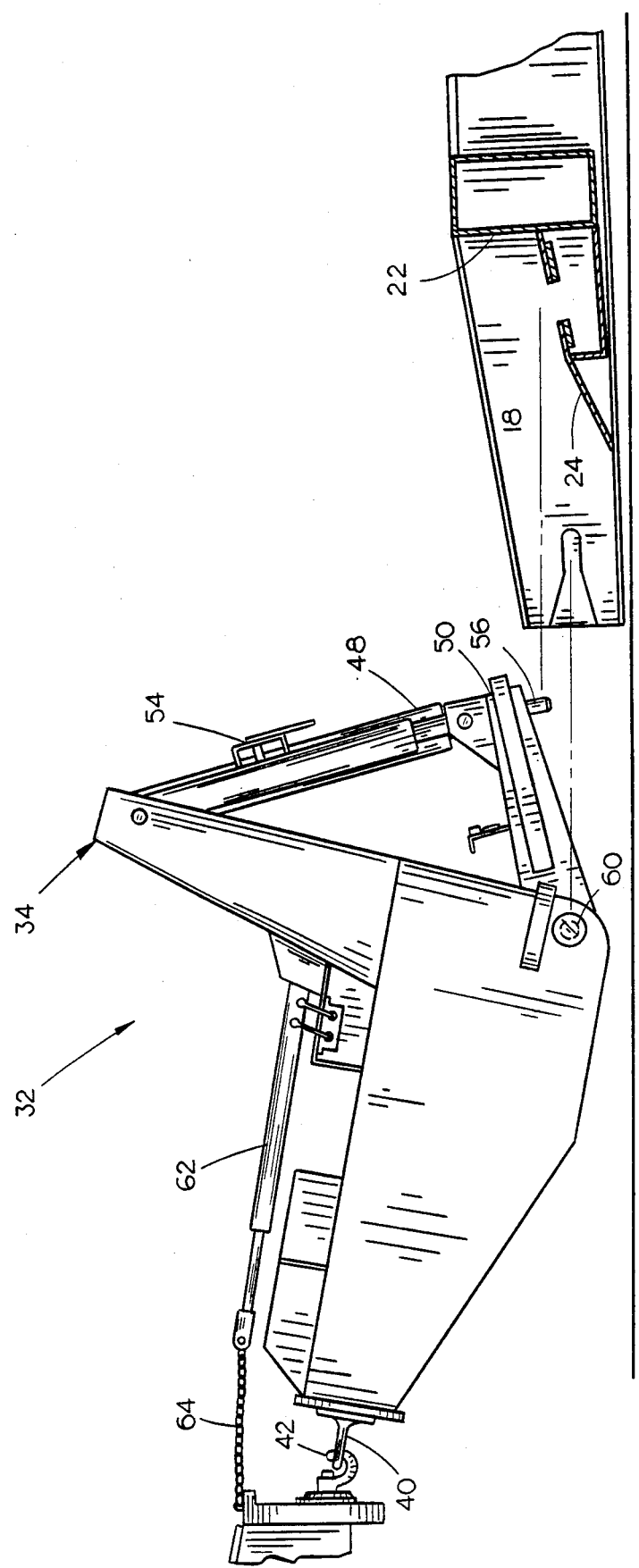
FIG. 4 is a side view illustrating the detachable gooseneck structure and its relationship to the forward end of the trailer.
Figure 5:
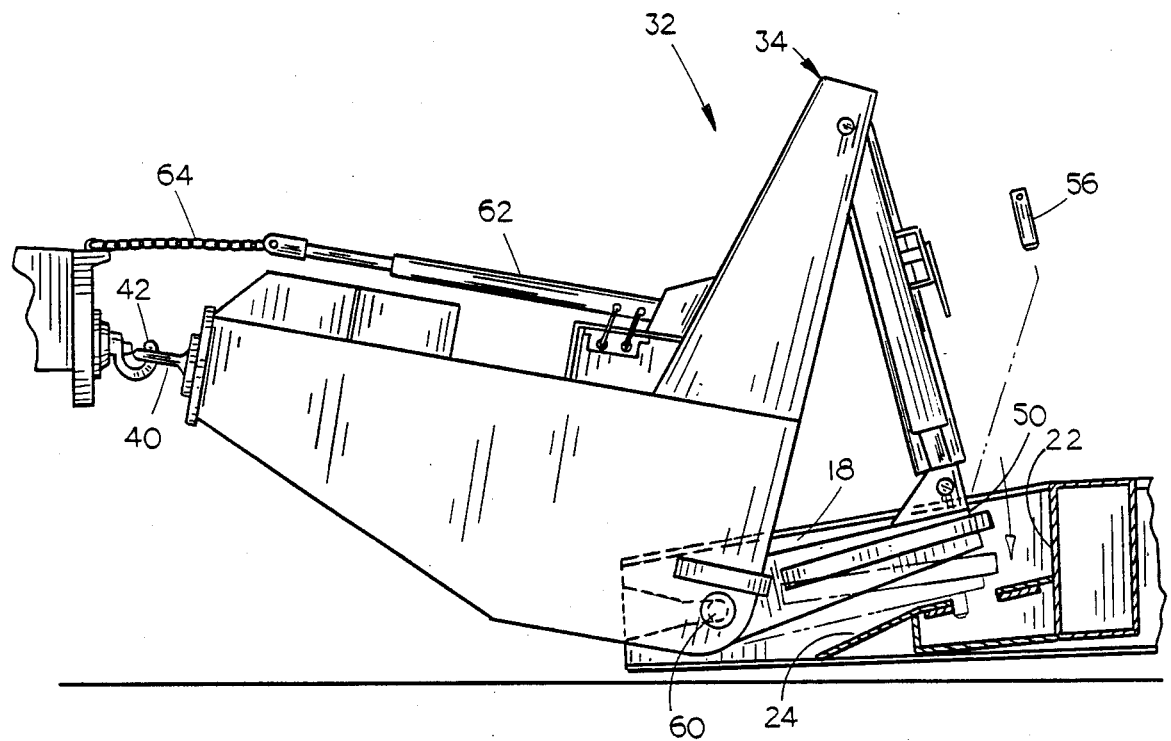
FIG. 5 is a view similar to FIG. 4.
Figure 6:
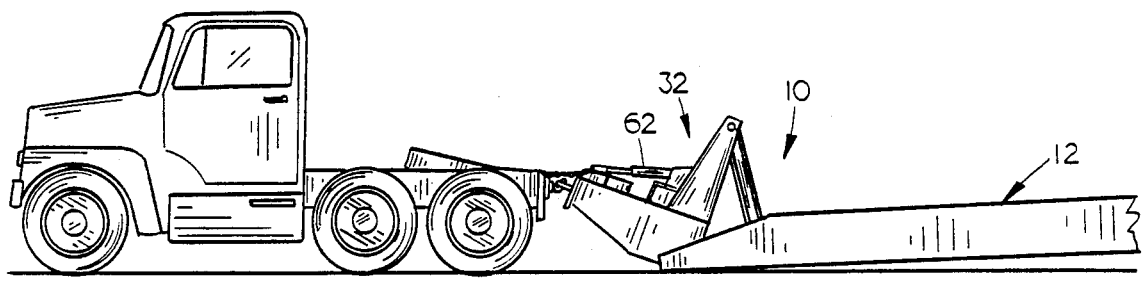
FIG. 6 is a side view illustrating the detachable gooseneck structure mounted on the trailer with the trailer being in its lowermost position.
Figure 7:
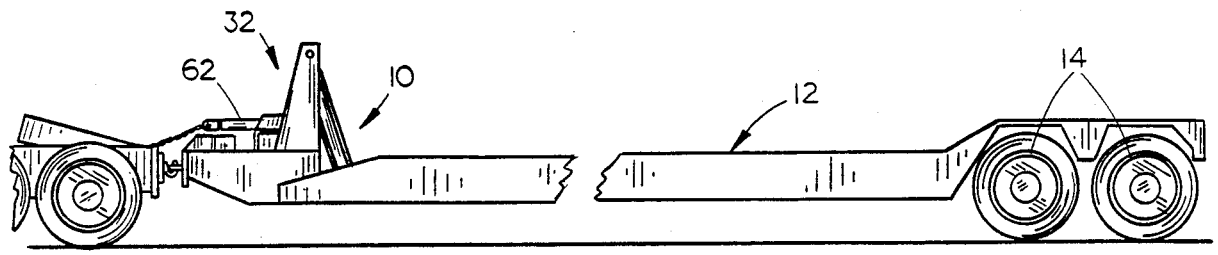
FIG. 7 is a view similar to FIG. 6 except that the trailer has been raised to its operative position.

A device is disclosed for raising, lowering and positioning a pintle eye style detachable gooseneck hitch assembly of a trailer. The trailer comprises a main frame portion having a gooseneck hitch assembly detachably connected to the forward end thereof. A longitudinally extending and horizontally disposed hydraulic cylinder is pivotally connected at its rearward end to the gooseneck hitch assembly and extends forwardly therefrom. A pair of chains are secured to the forward end of the hydraulic cylinder and extend forwardly and outwardly therefrom for connection to the rear of the truck to which the gooseneck hitch assembly is connected. When the gooseneck hitch assembly is detached from the trailer, retraction of the hydraulic cylinder causes the rearward end of the gooseneck hitch assembly to pivotally move upwardly. Conversely, extension of the hydraulic cylinder causes the rearward end of the gooseneck hitch assembly to be lowered.

DESCRIPTION OF THE PREFERRED EMBODIMENT

The numeral 10 refers to a detachable gooseneck trailer such as manufactured by Dakota Manufacturing Company of Mitchell, S. Dak. Trailer 10 includes a main trailer portion 12 supported by wheels 14. The forward end of trailer 10 is provided with a centrally disposed opening 16 defined by side frame members 18 and 20, rear frame member 22 and bottom frame member 24. As seen in the drawings, side frame members 18 and 20 are provided with openings 26 and 28 and bottom frame member 24 is provided with an opening 30.

Trailer 10 also includes a detachable gooseneck hitch assembly referred to generally by the reference numeral 32. Hitch assembly 32 comprises a main frame means 34 comprised of lower frame 36 and upper frame 38. A pintle eye hitch member 40 is provided at the forward end of the lower frame 36 for detachable connection with the pintle hook 42 mounted at the rearward end of truck 44.

A pair of hydraulic cylinders 46 and 48 are pivotally connected at their upper ends to the upper end of upper frame 34 and are pivotally connected at their lower ends to frame assembly 50 which is pivotally connected at its forward end to the lower end of upper frame 34. Locking mechanisms 52 and 54 are also provided for safety purposes. As seen in the drawings, pin 56 is removably mounted on frame assembly 50 for a purpose to be described hereinafter. As also seen in the drawings, a pair of pins 58 and 60 extend laterally outwardly from the lower end of upper frame 34.

Hydraulic cylinder 62 is pivotally connected at its rearward end to the forward portion of upper frame 34. The rod end of hydraulic cylinder 42 has a pair of chains 64 and 66 secured thereto which extend forwardly and outwardly therefrom. The forward ends of chains 64 and 66 are detachably connected to the rearward ends of the frame members of the truck above the pintle eye-pintle hook connection.

Assuming that the gooseneck hitch assembly 32 is disconnected from the trailer 10, the gooseneck hitch assembly is secured to the trailer in the following manner. If not already connected, the forward ends of chains 64 and 66 are secured to the rear of the truck frames. Although chains 64 and 66 are the preferred connectors, elongated bars, rods, etc. could also be employed. Chains are preferred since they are easier to store.

Retraction of the rod of cylinder 62 causes the rear end of the gooseneck hitch assembly 32 to be raised from the ground. The truck may then be maneuvered so that the rearward end of frame assembly 50 is received between the side frame members 18 and 20 at the forward end of trailer 10. The hydraulic cylinders 46 and 48 may be extended or retracted to properly position the frame assembly 30 between the side frames 18 and 20. Hydraulic cylinder 62 is extended or retracted to raise or lower the gooseneck hitch assembly so that the pins 58 and 60 may be received by the openings 26 and 28 respectively. When the pins 58 and 60 have been completely received by the openings 26 and 28, pin 56 is extended downwardly through frame assembly 50 so that the lower end thereof is received by the opening 30. Pin 50 is then locked in position. At this time, the chains 64 and 66 may be disconnected from the truck. Hydraulic cylinders 46 and 48 are then actuated to raise the forward end of the trailer from the ground.

The hydraulic cylinder 62, when not being used, may be easily removed from the hitch assembly and stored in a convenient location. It can therefore be seen that a novel means has been provided which permits the detachable gooseneck hitch assembly of a trailer to be raised, lowered or otherwise positioned to enable the gooseneck hitch assembly to be either connected to the trailer or disconnected therefrom. It can therefore be seen that the invention accomplishes at least all of its stated objectives.

I claim:

1. In combination with a truck having rearward and forward ends, said truck having a pintle hook hitch member at its rearward end,
    a wheeled trailer having rearward and forward ends,
    a hydraulically operated gooseneck hitch assembly detachably secured to the forward end of said trailer and having rearward and forward ends, said hitch assembly having a pintle eye hitch member at its said forward end for detachable connection with said pintle hook hitch member,
    a substantially horizontally disposed, hydraulic cylinder having rearward and forward ends,
    said hydraulic cylinder being connected at its rearward end to said gooseneck hitch assembly above and rearwardly of said pintle eye hitch member,
    first and second elongated connection means having rearward and forward ends,
    said first elongated connection means being connected at its rearward end to the forward end of said hydraulic cylinder and extending forwardly and outwardly therefrom, the forward end of said first connection means being secured to said truck laterally of said pintle hook hitch member,
    said second elongated connection means being connected at its rearward end to the forward end of said hydraulic cylinder and extending forwardly and outwardly therefrom, the forward end of said second connection means being secured to said truck laterally of said pintle hook hitch member,
    said first and second connection means defining a substantial V-shape,
    and means for extending and retracting said hydraulic cylinder for pivotally lowering and raising the rearward end of said gooseneck hitch assembly, about said pintle eye hitch member and said pintle hook hitch member to selectively vertically position the rearward end of said gooseneck hitch assembly when said gooseneck hitch assembly is detached from said trailer.

2. In combination,
    a truck having rearward and forward ends, said truck having a pintle hook hitch member at its rearward end,
    a wheeled trailer having rearward and forward ends,
    a hydraulically operated gooseneck hitch assembly detachably secured to the forward end of said trailer and having rearward and forward ends, said hitch assembly having a pintle eye hitch member at its said forward end for detachable connection with said pintle hook hitch member,
    a substantially horizontally disposed, hydraulic cylinder having rearward and forward ends,
    said hydraulic cylinder being connected at its rearward end to said gooseneck hitch assembly above and rearwardly of said pintle eye hitch member,
    first and second elongated chain means having rearward and forward ends,
    said first elongated chain means being connected at its rearward end to the forward end of said hydraulic cylinder and extending forwardly and outwardly therefrom, the forward end of said first chain means being secured to said truck laterally of said pintle hook hitch member,
    said second elongated chain means being connected at its rearward end to the forward end of said hydraulic cylinder and extending forwardly and outwardly therefrom, the forward end of said second chain means being secured to said truck laterally of said pintle hook hitch member,
    said first and second chain means defining a substantial V-shape,
    and means for extending and retracting said hydraulic cylinder for pivotally lowering and raising the rearward end of said gooseneck hitch assembly, about said pintle eye hitch member and said pintle hook hitch member to selectively vertically position the rearward end of said gooseneck hitch assembly when said gooseneck hitch assembly is detached from said trailer,
    said rearward end of said hydraulic cylinder means being selectively removably and pivotally secured to said gooseneck hitch assembly.

* * * * *